(12) United States Patent
Shimano et al.

(10) Patent No.: US 7,974,447 B2
(45) Date of Patent: Jul. 5, 2011

(54) IMAGE SYNTHESIZING DEVICE, IMAGE COLLATION DEVICE USING THE SAME, IMAGE SYNTHESIZING METHOD AND PROGRAM

(75) Inventors: Mihoko Shimano, Tokyo (JP); Etsuko Nagao, Kanagawa (JP)

(73) Assignee: Panasonic Corporation, Osaka (JP)

( * ) Notice: Subject to any disclaimer, the term of this patent is extended or adjusted under 35 U.S.C. 154(b) by 950 days.

(21) Appl. No.: 11/887,257

(22) PCT Filed: Jun. 8, 2006

(86) PCT No.: PCT/JP2006/311509
§ 371 (c)(1),
(2), (4) Date: Sep. 27, 2007

(87) PCT Pub. No.: WO2006/134821
PCT Pub. Date: Dec. 21, 2006

(65) Prior Publication Data
US 2009/0226029 A1    Sep. 10, 2009

(30) Foreign Application Priority Data

Jun. 14, 2005    (JP) .................................. 2005-173380

(51) Int. Cl.
*G06K 9/68* (2006.01)
*G06K 9/40* (2006.01)
(52) U.S. Cl. ........ 382/118; 382/217; 382/218; 382/219; 382/274
(58) Field of Classification Search ................. 382/118, 382/217, 218, 219, 274
See application file for complete search history.

(56) References Cited

U.S. PATENT DOCUMENTS
2001/0031073 A1    10/2001    Tajima

FOREIGN PATENT DOCUMENTS
| JP | 2001-283224 | 10/2001 |
| JP | 2002-024830 | 1/2002 |
| WO | 2006-049237 | 11/2006 |

OTHER PUBLICATIONS

International Search Report issued Jul. 11, 2006 in the International (PCT) Application of which the present application is the U.S. National Stage.

*Primary Examiner* — Bhavesh M Mehta
*Assistant Examiner* — Utpal Shah
(74) *Attorney, Agent, or Firm* — Wenderoth, Lind & Ponack, L.L.P.

(57) ABSTRACT

An image synthesizing device for synthesizing a second image of an object in a predetermined illumination condition from a first image of the object includes an illumination condition estimation section for estimating an illumination condition from a luminance value of the first image, and a normal information estimation section estimates normal information containing a normal direction of the object, with regard to a predetermined pixel in the first image. An error component information estimation section estimates information of an error component in the predetermined illumination condition, an image synthesizing section synthesizes the second image of the object in the predetermined illumination condition, and the normal information estimation section estimates normal information of a predetermined pixel from information of a plurality of the pixels in the first image.

9 Claims, 8 Drawing Sheets

IMAGE SYNTHESIZING DEVICE, IMAGE COLLATION DEVICE USING THE SAME, IMAGE SYNTHESIZING METHOD AND PROGRAM

TECHNICAL FIELD

The present invention relates to an image collation device for comparing and collating an input two-dimensional image with a previously registered two-dimensional image, and more particularly, to an image synthesizing device for creating a registered image group used in collating images, an image collation device using the same, and an image synthesizing method.

BACKGROUND ART

Conventionally, an image collation device for comparing and collating an input two-dimensional image with a previously recorded two-dimensional image has been practically used. In particular, various image collation devices for realizing a face authentication method that is one of the authentication methods using biometrics have been proposed. In such image collation devices, face images of a plurality of persons who can be authenticated (hereinafter, referred to as "registered persons") are previously registered in a database as registered images. A face image of a person who is to be provided with authentication (hereinafter, referred to as "a person to be authenticated") and a registered image are compared and collated with each other. As a result, when it is determined that the face image of the person to be authenticated matches with or resembles a registered image of a certain registered person, the person to be authenticated is authenticated as the certain registered person.

In such an image collation device, there is a conventional problem that the authentication rate may be reduced due to differences between photographing conditions when a face image of a person to be authenticated is taken and photographing conditions when a registered image is taken. For example, in a case where an illumination condition such as a direction in which light is illuminated to the person to be authenticated when the face image of the person to be authenticated is taken (hereinafter, this direction is referred to as an "illumination direction") is different from an illumination condition such as the illumination direction when the registered image is taken, even when the same object is taken, it could be determined that they do not match each other as a result of the comparison and collation.

In order to solve these problems, various techniques have been proposed recently. For example, as to each of the registered persons, from one registered image, an illumination condition when the image is taken, a face shape (normal vector), a reflectance and the like are estimated. By using these conditions, a plurality of images under different illumination conditions (referred to as a "registered image group") are formed and registered in a database, and then at the time of authentication, the face image of the object is compared and collated with all the registered image groups that have been registered in the database, thereby improving the authentication rate (see, for example, T. Sim, T. Kanade, "Combining Models and Exemplars for Face Recognition: An Illuminating Example," Proc. CVPR Workshop on Models versus Exemplars in Computer Vision, 2001).

According to the above-described conventional technique, first, a statistical model is made using a learning face image set (this image set is referred to as a "bootstrap image" hereinafter) that is taken under various illumination conditions, with respect to a person different from the previously registered person. Then, using the above statistical model, a plurality of registered image groups taken under different illumination conditions are synthesized from the registered images of the registered persons.

However, according to the above-described conventional technique, when the face shape (normal vector) and an error component and the like other than a diffuse reflection component at the time of shooting are estimated from one registered image with respect to each of the registered persons, since a calculation is performed with respect to each of pixels constituting the registered image separately, in a case where a pixel to be calculated is positioned in shadow, a normal vector and a reflectance (a so-called normal albedo vector) about the pixel cannot be always correctly estimated, so that there arises the problem that an actually matching registered image group cannot be created.

SUMMARY OF THE INVENTION

The present invention has been made to solve the above problems and it is an object of the present invention to provide a technique by which even when a pixel to be calculated is positioned in shadow, a normal vector and a reflectance about the pixel can be correctly estimated and an actually matching registered image group can be created.

BACKGROUND OF THE INVENTION

An image synthesizing device according to the present invention is an image synthesizing device for synthesizing a second image of an object in a predetermined illumination condition from a first image of the object includes: an illumination condition estimation section for estimating an illumination condition of the object in the first image from a luminance value of the first image; a normal information estimation section for estimating normal information containing a normal direction of the object, about a predetermined pixel in the first image, based on the illumination condition estimated by the illumination condition estimation section; an error component information estimation section for estimating information of an error component other than a diffuse reflection component in the luminance value of the predetermined pixel in the first image, and estimating error component information in the predetermined illumination condition from the estimated error component information; and an image synthesizing section for synthesizing the second image of the object in the predetermined illumination condition, from the normal information of the object estimated by the normal information estimation section, and the error component information in the predetermined illumination condition estimated by the error component information estimation section, wherein the normal information estimation section estimates the normal information of the predetermined pixel from information of a plurality of the pixels in the first image.

According to the above configuration, when the normal information estimation section estimates the normal information, since the normal information can be estimated from the information of the plurality of pixels in the first image, even in a case where a pixel to be calculated is positioned in shadow, a normal vector and a reflectance about the pixel can be correctly estimated using another highly reliable pixel, so that the actually matching registered image group can be created.

In addition, the error component information estimation section may estimate error component information of the predetermined pixel from the information of the plurality of the pixels in the first image.

According to the above configuration, even in a case where an error component is deviated from the diffuse reflection component, the error component in the predetermined pixel can be correctly estimated using another highly relevant pixel.

In addition, the normal information estimation section may estimate the normal direction based on a statistical model calculated by a learning image previously based on the information of the plurality of pixels.

According to the above configuration, the images under different illumination conditions can be more correctly estimated by preparing the statistical model previously.

Furthermore, the error component information estimation section may estimate the error component information based on a statistical model calculated by a learning image previously based on the information of the plurality of pixels.

According to the above configuration, as for the error component also, the images under different illumination conditions can be more correctly estimated by preparing the statistical model previously.

In addition, the statistical model may be a statistical model of each vector of an image generation model represented by $$Y = L^T B + V \quad \text{[Equation 1]}$$

(where Y is an image vector of a pixel, $L^T$ is an illumination matrix in which transposed matrix $S^T$ of illumination matrix S is diagonally arranged, B is a normal albedo vector, and V is an error vector).

According to the above configuration, the specific statistics value can be calculated for the plurality of pixels at the same time.

In addition, an illumination condition input section for receiving an illumination condition containing a plurality of illumination angles different from one another may be provided and the image synthesizing section may synthesize a second image in each of the plurality of illumination conditions inputted from the illumination condition input section.

According to the above configuration, the second image corresponding to a desired illumination condition can be provided.

Furthermore, an image collation device according to the present invention includes the image synthesizing device according to the present invention; a registered image group storing section for storing the second image created by the image synthesizing device as a registered image group; a comparative image input section for receiving a comparative image to be compared; and a comparison and collation section for comparing and collating the comparative image inputted from the comparative image input section and the registered image group stored in the registered image group storing section.

According to the above configuration, when the normal information estimation section estimates the normal information, since the normal information of the plurality of pixels in the first image can be estimated at the same time by the image synthesizing device according to the present invention, even in a case where the pixel to be calculated is positioned in shadow, a normal vector and a reflectance about the pixel can be correctly estimated using another highly reliable pixel, so that the actually matching registered image group can be created, and since that the registered image group and the comparative image are compared and collated, a high collation rate can be realized.

Furthermore, there may be provided a comparative image illumination condition estimation section for estimating an illumination condition in the comparative image inputted from the comparative image input section and an image retrieving section for retrieving a registered image of the illumination condition estimated by the comparative image illumination condition estimation section, from the registered image group storing section, and the comparison and collation section may collate the registered image retrieved by the image retrieving section and the comparative image.

According to the above configuration, since the comparison and collation can be performed by estimating the illumination condition from the comparative image and retrieving the registered image corresponding to the estimated illumination condition, from the registered image group stored in the registered image group storing section, the number of comparing and collating processes can be reduced and the operation load to a CPU and the like can be reduced, so that the configuration is suitable for a small apparatus.

In addition, there may be provided a first feature amount calculation section for calculating a feature amount of the second image created by the image synthesizing device, and a second feature amount calculation section for calculating a feature amount of the comparative image inputted by the comparative image input section, and the registered image group storing section may store the feature amount of the second image, and the comparison and collation section may compare and collate the registered image group and the comparative image using the feature amount.

According to the above configuration, since the feature amount data calculated by the feature amount calculation section is stored in the registered image group storing section, necessary storing capacity can be small as compared with the configuration in which the image information of registered image group itself is stored, and since the comparison and collation section uses the feature amounts outputted from the registered image group storing section and the feature amount calculation section, the calculation process in the comparison and collation section can be small in scale as compared with the configuration in which matching is performed for the whole image, and the operation load to the CPU and the like can be reduced, so that it is suitable for the small apparatus.

Next, an image synthesizing method according to the present invention is a method of synthesizing a second image of an object in a predetermined illumination condition from a first image of the object and includes step (i) of estimating an illumination condition of the object in the first image from a luminance value of the first image; step (ii) of estimating normal information containing a normal direction of the object, about a predetermined pixel in the first image, based on the illumination condition estimated in step (i); step (iii) of estimating information of an error component other than a diffuse reflection component in the luminance value of the predetermined pixel in the first image, and estimating error component information in the predetermined illumination condition, from the estimated error component information; and step (iv) of synthesizing the second image of the object in the predetermined illumination condition, based on the normal information of the object estimated in step (ii), and on the estimation in step (iii), wherein the normal information of the predetermined pixel is estimated from information of a plurality of the pixels in the first image in step (ii).

According to the above method, when the normal information is estimated, since the normal information can be estimated from the information of the plurality of pixels in the first image, even in a case where the pixel to be calculated is positioned in shadow, the normal vector and the reflectance of the pixel can be correctly estimated using another highly reliable pixel, so that the actually matching registered image group can be created.

Furthermore, a program according to the present invention is a program for synthesizing a second image of an object in a predetermined illumination condition from a first image of the object, and enables a computer to execute step (i) of estimating an illumination condition of the object in the first image from a luminance value of the first image; step (ii) of estimating normal information containing a normal direction of the object, about a predetermined pixel in the first image, based on the illumination condition estimated in step (i); step (iii) of estimating information of an error component other than a diffuse reflection component in the luminance value of the predetermined pixel in the first image, and estimating error component information in the predetermined illumination condition, from the estimated error component information; and step (iv) of synthesizing the second image of the object in the predetermined illumination condition, from the normal information of the object estimated in step (ii), and the error component information in the predetermined illumination condition estimated in step (iii), wherein the normal information of the predetermined pixel is estimated from information of a plurality of the pixels in the first image in step (ii).

By causing the computer to execute the above program, when the normal information is estimated, since the normal information can be estimated from the information of the plurality of pixels in the first image, even in a case where the pixel to be calculated is positioned in shadow, the normal vector and the reflectance of the pixel can be correctly estimated using another highly reliable pixel, so that the actually matching registered image group can be created.

As described above, with the image synthesizing device and the image collation device using the same and the image synthesizing method according to the present invention, the technique can be provided in which even when the pixel to be calculated is positioned in shadow, the normal vector and the reflectance about the pixel can be correctly estimated and the actually matching registered image group can be created.

REFERENCE MARKS IN THE DRAWINGS 1, 40, 50 image collation device
2 registered image input section
3 registered image group formation section
4 registered image group storing section
5 comparative image input section
6 illumination condition estimation section
7 information retrieving section
8, 33 comparison and collation section
9 output section
20, 26 registered image
25 comparative image
30 registered image group
31, 32 feature amount calculation section
34 feature amount storing section
41 illumination condition estimation section
42 normal information estimation section
43 error component information estimation section
44 illumination condition input section
45 image synthesizing section

DETAILED DESCRIPTION OF THE INVENTION

Hereinafter, embodiments of the present invention are described in detail with reference to the drawings.

First Embodiment

Figure 1:
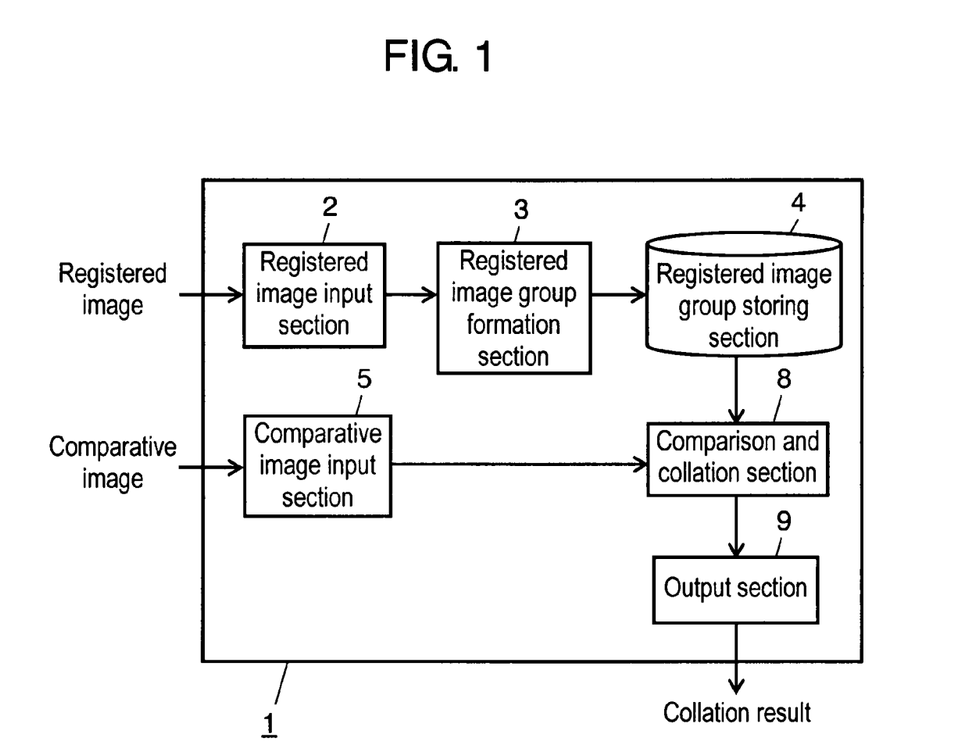
FIG. 1 is a block diagram showing a configuration of an image collation device according to a first embodiment of the present invention.

First, an image collation device according to a first embodiment of the present invention is described. FIG. 1 is a block diagram showing a configuration of image collation device 1 according to the first embodiment of the present invention.

As shown in FIG. 1, image collation device 1 according to the first embodiment of the present invention includes registered image input section 2 to which a registered image of a registered person is inputted, registered image group formation section 3 for creating a registered image group in a plurality of illumination conditions from the registered image inputted by registered image input section 2 by a method described below, registered image group storing section 4 for storing the registered image group created by registered image group formation section 3, comparative image input section 5 to which a face image of a person to be authenticated (hereinafter, referred to as a "comparative image") is inputted, comparison and collation section 8 for comparing and collating the comparative image inputted from comparative image input section 5 and the registered image group stored in registered image group storing section 4 and outputting a result thereof, and output section 9 for outputting information such as the result outputted from comparison and collation section 8 to another device and the like externally connected.

Registered image input section 2 and comparative image input section 5 may receive an image from a known storage medium, or may use known reading means such as a scanner, or may receive an image taken by a camera and the like. In addition, image collation device 1 according to the first embodiment of the present invention is not limited to a configuration including registered image input section 2 and comparative image input section 5 individually, and registered image input section 2 and comparative image input section 5 may share one input means.

Regarding registered image group formation section 3 and comparison and collation section 8, a function as described below may be implemented by software or may be implemented by hardware such as a dedicated circuit.

Registered image group storing section 4 can use one selected from known recording media such as a hard disk device (HDD) and a semiconductor memory.

Output section 9 may be configured such that a signal from comparison and collation section 8, which shows whether collation can be performed or not, is outputted as it is, or may inform the person to be authenticated of collation results by video or audio data.

As a function of comparison and collation section 8, a known image comparing and collating method such as an eigenspace method, a subspace method or a KNN method can be used.

Figure 2:
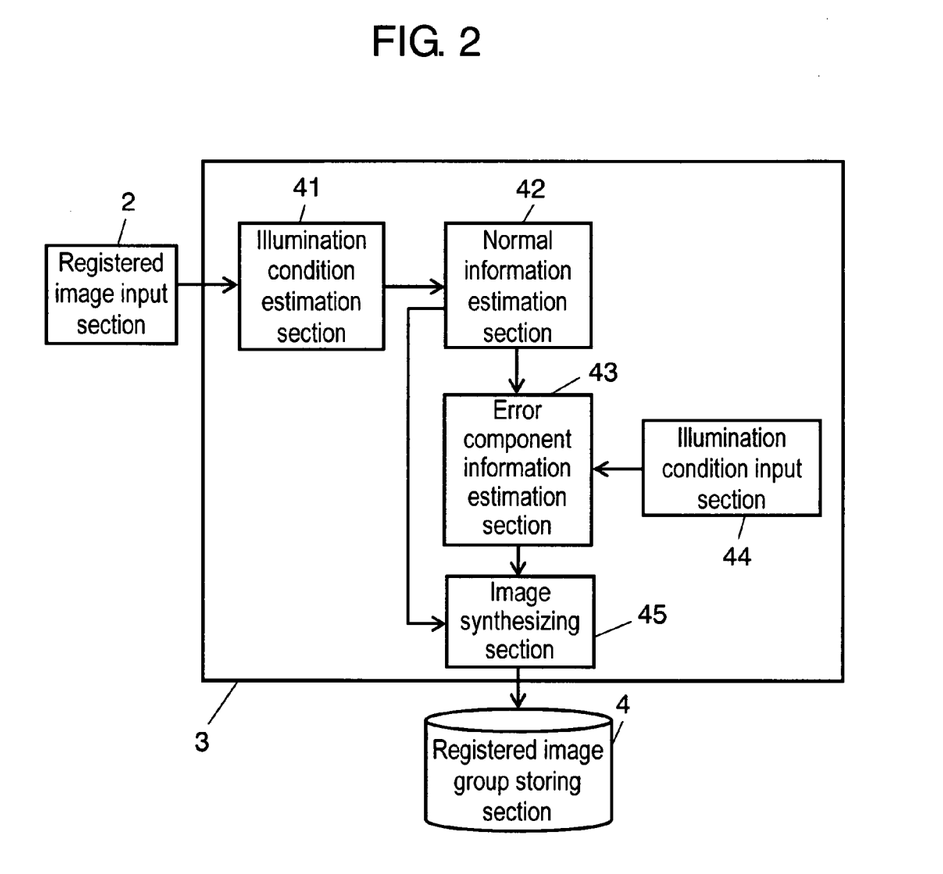
FIG. 2 is a functional block diagram showing a registered image group formation section of the image collation device according to the first embodiment of the present invention.
Figure 3:
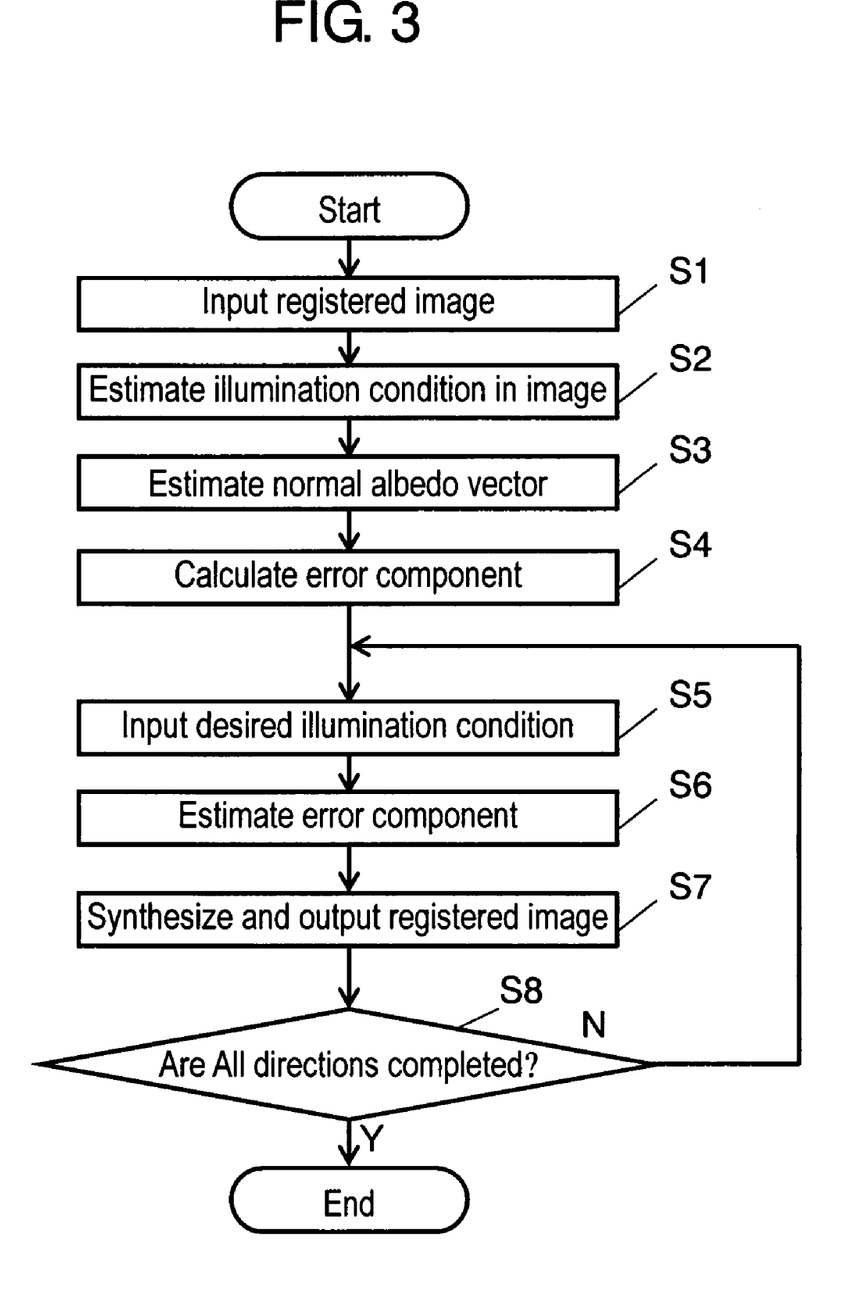
FIG. 3 is a flowchart showing process steps of the registered image group formation section in the image collation device according to the first embodiment of the present invention.

Here, a function of registered image group formation section 3 according to the first embodiment of the present invention is described in detail. FIG. 2 is a functional block diagram of registered image group formation section 3 in image collation device 1 according to the first embodiment of the present invention, and FIG. 3 is a flowchart showing process steps of registered image group formation section 3 in image collation device 1 according to the first embodiment of the present invention. The function of registered image group formation section 3 can be implemented by both hardware and software. When the function of the registered image group formation section 3 is implemented by software, processes from step S1 to step S8 shown in FIG. 3 to be described later are to be described in the software and executed by a computer.

As shown in FIG. 2, registered image group formation section 3 according to the first embodiment of the present invention includes illumination condition estimation section 41 for estimating an illumination condition to an object in a registered image from a luminance value of the registered image inputted from registered image input section 2, normal information estimation section 42 for estimating normal information containing a normal direction of the object at a predetermined pixel in the registered image based on the illumination condition estimated by illumination condition estimation section 41, error component information estimation section 43 for estimating information of an error component other than a diffuse reflection component in the luminance value of the predetermined pixel in the registered image, and estimating information of the error component in a predetermined illumination condition, from the estimated error component information, image synthesizing section 45 for synthesizing a registered image of the object in the predetermined illumination condition, from the normal information of the object estimated by normal information estimation section 42 and the information of the error component in the predetermined illumination condition estimated by error component information estimation section 43, and illumination condition input section 44 for inputting the predetermined illumination condition to error component information estimation section 43.

Figure 4:
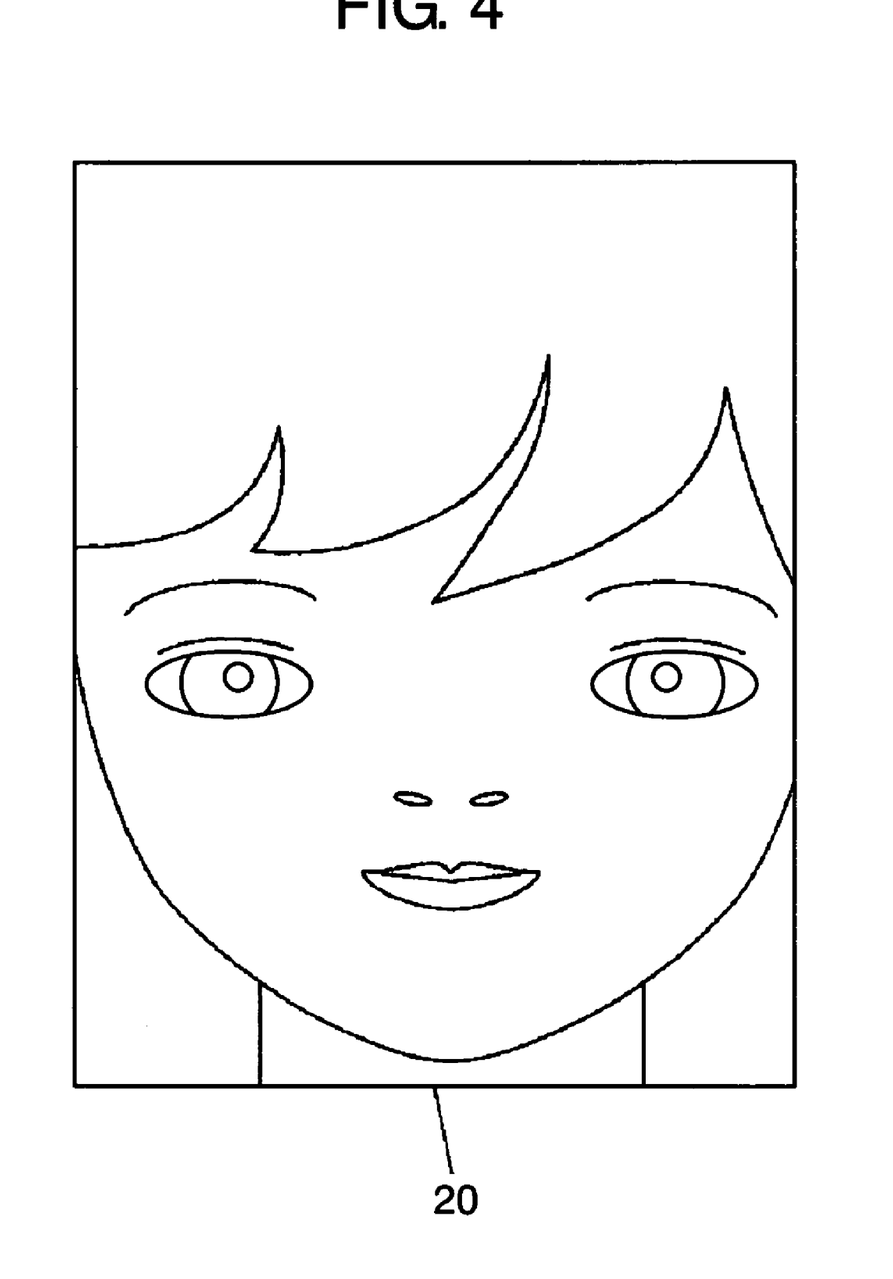
FIG. 4 is a schematic view showing one example of a registered image according to the first embodiment of the present invention.

Next, the process steps of registered image group formation section 3 according to the first embodiment of the present invention is described with reference to FIG. 3. First, registered image 20 is inputted from registered image input section 2 to illumination condition estimation section 41 of registered image group formation section 3 (S1). Here, it is assumed that registered image 20 is one face image of a person to be registered. FIG. 4 schematically shows one example of registered image 20 according to the first embodiment of the present invention. For example, in image collation device 1 according to the first embodiment of the present invention, although an image provided by taking the object from the front and having the total of 10800 pixels of 120 pixels long by 90 pixels wide is actually used as registered image 20, the present invention is not limited to this image size.

Here, a description is made of a learning step using an image set (bootstrap image) of other persons to be previously performed separately in order to calculate a statistical model used in each estimation step to be described below.

First, with the bootstrap image set, statistics value is calculated from brightness (luminance value) observed at a certain position on the surface of a face, in view of a correlation among positions of shapes of the face and reflection characteristics. More specifically, a normal vector, albedo, and an error value are calculated with respect to each person in the bootstrap image set previously prepared separately from the registered image, and then a statistics value is calculated using the normal vector, albedo, and error value calculated for the plural (K) people. The bootstrap image set used here is configured by an image set taken for the plurality of people under J pieces of known illumination conditions $s_j$. An image set $I^{(l)}$ taken for a first person under J light sources is as follows.

$$I^{(l)} = B^{(l)T}S' + E^{(l)} \quad \text{[Equation 2]}$$

Here, $I^{(l)}$ denotes the image set provided for person 1 under J pieces of illumination conditions, $B^{(l)}$ denotes a normal albedo matrix of the face of person 1, S' denotes an illumination condition set showing J illumination directions and their intensities, and $E^{(l)}$ denotes an error matrix with respect to J pieces of illumination conditions.

Then, $B^{(l)}$ is calculated by a least square method as follows.

$$B^{(l)} = (S'S'^T)^{-1}S'I^{(l)} \quad \text{[Equation 3]}$$

Thus, a remainder provided by subtracting a diffusion component is error matrix $E^{(l)}$ as follows.

$$E^{(l)} = I^{(l)} - B^{(l)T}S' \quad \text{[Equation 4]}$$

Furthermore, the statistics value of the normal vector and error value of the face is calculated using normal albedo matrix $B^{(l)}$ and error matrix $E^{(l)}$ of the face estimated for all the people in the bootstrap image set, as follows. Similar to normal albedo vector B, each matrix $B^{(l)}$ is developed to 3D vector for K people and its average vector μB (3D vector) and covariance matrix CB (3d×3d matrix) are calculated. As for a statistics value of error term v (s), average vector μv ($s_j$) can be calculated from K error vectors $v^{(l)}$ ($s_j$) in each illumination condition $s_j$.

In addition, covariance matrix Cv of dJ×dJ is calculated from K error matrixes $E^{(l)}$ by a similar method used when covariance matrix CB is calculated from normal albedo matrix $B^{(l)}$.

In this way, in image collation device 1 according to the first embodiment of the present invention, the statistics value used in estimating the normal vector or the error component is found by using algorithm in which the correlation among the facial surface positions can be taken into consideration.

Referring to FIG. 3 again, after step S1, illumination condition estimation section 41 of registered image group formation section 3 estimates an illumination direction and its intensity at the time of taking one registered image 20 (hereinafter, referred to simply as "illumination condition") (S2). The estimation of the illumination condition of registered image 20 can be performed by simple kernel regression as shown in the following equations (1) to (3) when it is assumed that each of J pieces of the illumination condition in a learning image set to calculate the statistics value is $s_j$, a width of Gaussian kernel is $\sigma_j$, an average of each illumination pattern of a learning image is $a_j$, and an input image is b. In addition, according to the first embodiment of the present invention, width $\sigma_j$ of Gaussian kernel is determined according to the above-described Non-patent Document 1.

In addition, only a direction of an illumination vector can be estimated by using a vector normalized as illumination condition $s_j$ at this time. In addition, in a case of an illumination condition in which brightness is largely different between the bootstrap image and the registered image, for example, when values normalized as $a_j$ and b are assigned to equation (1), the illumination can be estimated with higher precision.

[Equation 5]

$$s = \sum_{j=1}^{J} \omega_j s_j \Big/ \left( \sum_{j=1}^{J} \omega_j \right) \quad (1)$$

[Equation 6]

$$\omega_j = \exp\left[-\frac{1}{2}(D(b, a_j)/\sigma_j)^2\right] \quad (2)$$

[Equation 7]

$$D(b, a_j) = \|b - a_j\|_2 \quad (3)$$

Next, normal information estimation section 42 of registered image group formation section 3 estimates a value of a normal albedo vector that is normal information taking the normal direction and reflectance of the object into account, from the luminance value of each pixel of registered image 20 (S3). The normal albedo vector means a vector provided by multiplying the normal direction vector of the object by its albedo (reflectance).

The estimating method of the value of the normal albedo vector in step S3 is described in detail.

First, as in equation (4), a model representing reflection in the object and being capable of collectively representing luminance values of d pixels contained in each image is introduced. Thus, taking the correlation among the pixels into account explicitly, a reflection component other than Lambertian component can be expressed as error term V in equation (4), and the statistics value of error term V can be obtained from the bootstrap image. Thus, a subtle reflection component such as highlight, interreflection and shadow under a new illumination condition can also be estimated.

[Equation 8]

$$Y = L^T B + V \quad (4)$$

$$Y = \begin{bmatrix} i_1 \\ i_2 \\ \vdots \\ i_{d-1} \\ i_d \end{bmatrix}$$

$$L^T = \begin{bmatrix} S^t & 0 & 0 & 0 & 0 \\ 0 & S^t & 0 & 0 & 0 \\ 0 & 0 & S^t & 0 & 0 \\ 0 & 0 & 0 & \ddots & 0 \\ 0 & 0 & 0 & 0 & S^t \end{bmatrix}$$

$$B = \begin{bmatrix} b_1 \\ b_2 \\ \vdots \\ b_{d-1} \\ b_d \end{bmatrix}$$

$$V = \begin{bmatrix} e_1 \\ e_2 \\ \vdots \\ e_{d-1} \\ e_d \end{bmatrix}$$

$$i_1 = \begin{bmatrix} i_{1,1} \\ i_{1,2} \\ \vdots \\ i_{1,m-1} \\ i_{1,m} \end{bmatrix}$$

$$b_1 = \begin{bmatrix} b_{1,1} \\ b_{1,2} \\ b_{1,3} \end{bmatrix}$$

$$S = \begin{bmatrix} s_{11} & s_{12} & \cdots & s_{1m} \\ s_{21} & s_{22} & \cdots & s_{2m} \\ s_{31} & s_{32} & \cdots & s_{3m} \end{bmatrix}$$

$$e_1 = \begin{bmatrix} e_{1,1} \\ e_{1,2} \\ \vdots \\ e_{1,m-1} \\ e_{1,m} \end{bmatrix}$$

As shown in equation (4), image vector Y of d pixels is provided by multiplying illumination matrix $L^T$ in which transposed matrix $S^T$ of illumination matrix S is diagonally arranged by normal albedo vector B of d pixels and adding the value of error vector V of d pixels to it. In addition, image vector Y is provided by arranging luminance vector i of each pixel for d pixels, normal albedo vector B is provided by arranging normal albedo vector b of each pixel for d pixels, and error vector V is provided by arranging error vector e of each pixel for d pixels. Furthermore, luminance vector i (m-dimensional) is provided by arranging luminance values in m illumination patterns in one pixel, normal albedo vector b is a normal albedo vector (three-dimensional) in one pixel, vector e is a vector (m-dimensional) provided by arranging error component values in m illumination patterns in one pixel, and illumination matrix S is a matrix of (3×m) illumination conditions s showing the direction and intensity of the light source.

Thus, by assuming the reflection model for generating the image as shown in equation (4), calculation can be performed for the plurality of pixels in the image at the same time, so that the calculation can be performed rapidly.

Error average μv and variance $\Sigma_v$ that are statistics values for illumination condition s of the input image are interpolated from the statistics value of the bootstrap image set in a known illumination condition by kernel regression. More specifically, average $\mu_v$ is found by replacing $s_j$ with $\mu_v(s_j)$ by a method similar to equation (1) and linear sum of kernel function centering on known illumination condition vector $s_j$. The component of variance $\Sigma_v$ is also interpolated from previously calculated statistics value $C_v$ by kernel regression, similarly to average $\mu_v$.

Under the above assumption, normal albedo vector $B_{MAP}$ (x) about registered image 20 can be estimated using MAP (Maximum A Posteriori) estimation as shown in equation (5).

$$B_{MAP} = [LS_V^{-1}L^T + C_B^{-1}]^{-1}[LS_V^{-1}(Y-\mu_V) + C_B^{-1}\mu_B] \quad (5)$$

$$B_{MAP} = [L\Sigma_V^{-1}L^T + C_B^{-1}]^{-1}[L\Sigma_V^{-1}(Y-\mu_V) + C_B^{-1}\mu_B] \quad \text{Equation 9}$$

In addition, equation (5) is derived as follows.

First, Gaussian distribution is described as N (μ, C) using average vector μ and covariance matrix C. Conditional distribution P (B|Y) of normal albedo vector B when image vector Y is given, conditional distribution P (Y|B) of image vector Y when normal albedo vector B is given, and distribution P (B) of normal albedo vector B are as follows.

$$P(B|Y) = N(B_{MAP}, R_B)$$

$$P(Y|B) = N(L^T B + \mu_Y, S_V)$$

$$P(B) = N(\mu_B, C_B) \quad \text{[Equation 10]}$$

In addition, the following relation can be provided based on Bayesian Theorem.

$$P(B \mid Y) \propto P(Y \mid B) \times P(B) \quad \text{[Equation 11]}$$

$$\propto N(L^T B + \mu_Y, S_V) \times N(\mu_B, C_B)$$

$$\propto \exp\left(-\frac{1}{2}G\right)$$

Here, G designates a scalar value as shown below.

$$G = \begin{bmatrix}(Y - L^T B - \mu_V)^T \\ S_V^{-1}(Y - L^T B - \mu_V)\end{bmatrix} + \begin{bmatrix}(B - \mu_B)^T \\ C_B^{-1}(B - \mu_B)\end{bmatrix} \quad \text{[Equation 12]}$$

$$= B^T \begin{bmatrix}LS_V^{-1}L^T + \\ C_B^{-1}\end{bmatrix} B - 2\begin{bmatrix}(Y - \mu_V)^T S_V^{-1} L^T + \\ \mu_B^T C_B^{-1}\end{bmatrix} B + \text{const}$$

Here, in order to derive normal albedo vector B for maximizing conditional distribution P (B|Y) of normal albedo vector B when image vector Y is given, scalar value G is differentiated with respect to normal albedo vector B and set to 0.

$$\frac{\partial G}{\partial B} = \quad \text{[Equation 13]}$$

$$2[LS_V^{-1}L^T + C_B^{-1}]B - 2[(Y-\mu_V)^T S_V^{-1} L^T + \mu_B^T C_B^{-1}]^T = 0$$

Thus, MAP estimation of normal albedo vector B is provided as shown in equation (9).

In addition, it is preferable from a practical standpoint that normal information estimation section 42 of registered image group formation section 3 estimates normal albedo vector $B^{(i)}$ from the image set from which a pixel having a luminance value greater than a predetermined threshold value and a pixel having a luminance value smaller than the predetermined threshold value are removed so as to remove the influence such as highlight and shadow, in the bootstrap image when the statistics model of each vector is formed by assuming a reflection model described in equation (4).

Then, after normal information estimation section 42 has estimated normal albedo vector $B_{MAP}$ (x) from registered image 20 by using the above-described equation (5), error component information estimation section 43 of registered image group formation section 3 estimates error vector $V_{MAP}$ (x) under a new illumination condition of registered image 20 based on equation (6) (S4).

$$Pr(V(s_0) \mid Y, L, s_0) = Pr(V(s_0) \mid Y, L, s_0, B) \quad \text{[Equation 14]}$$
$$= Pr(V(s_0) \mid V, s_0)$$

$$Pr\left(\begin{bmatrix}V(s_0) \\ V\end{bmatrix}\right) = N\left(\begin{bmatrix}\mu_{V(0)} \\ \mu_V\end{bmatrix}, \begin{bmatrix}Q_{V(0)}^2 & R^T \\ R & S_V\end{bmatrix}\right)$$

$$Pr(V(s_0) \mid V, s_0) = N_{V(s_0)}(V_{MAP}, Q_V^2)$$

[Equation 15]

$$V_{MAP} = \mu_{V(0)} + R^T S_V^{-1}(V - \mu_V) \quad (6)$$
$$Q_V^2 = Q_{V(0)}^2 - R^T S_V^{-1} R$$

[Equation 16]

$$R^T = R_{xy} = (R_{yx})^T$$

$$r_{xy} = [\sigma_{1,v(0,1)}, \sigma_{1,v(0,2)}, \ldots, \sigma_{1,v(0,J)}]$$

$$R = R_{yx} = \begin{bmatrix}r_1 \\ \vdots \\ r_d\end{bmatrix}$$

$$r_1 = \begin{bmatrix}\sigma_{1,1,v(1,0)} & \sigma_{1,2,v(1,0)} & & \sigma_{1,d,v(1,0)} \\ \sigma_{1,1,v(2,0)} & \sigma_{1,2,v(2,0)} & & \sigma_{1,d,v(2,0)} \\ \vdots & \vdots & \ddots & \vdots \\ \sigma_{1,1,v(m,0)} & \sigma_{1,2,v(m,0)} & & \sigma_{1,d,v(m,0)}\end{bmatrix}$$

$$r_d = \begin{bmatrix}\sigma_{d,1,v(1,0)} & \sigma_{d,2,v(1,0)} & & \sigma_{d,d,v(1,0)} \\ \sigma_{d,1,v(2,0)} & \sigma_{d,2,v(2,0)} & & \sigma_{d,d,v(2,0)} \\ \vdots & \vdots & \ddots & \vdots \\ \sigma_{d,1,v(m,0)} & \sigma_{d,2,v(m,0)} & & \sigma_{d,d,v(m,0)}\end{bmatrix}$$

A value of each a may be calculated in the same manner as equation (1), for example. Element ρ of a variance matrix of an error component corresponding to new illumination is calculated using linked illumination vector t linking two illumination vectors s as follows. Average $\mu V_{new}$ and a value of element R are also interpolated from average $\mu V$ and variance $\Sigma V$ by kernel regression. Although this is calculated by the same method used when average $\mu v$ and variance $\Sigma v$ are calculated, these values are found by the linear sum of kernel function centering on the linked vector between known illumination conditions $s_j$ with respect to a linked vector of illumination condition $s_{new}$ estimated as illumination condition s this time.

$$\rho_{v(p,q)} = \sum_{j,k} \omega_{jk} \rho_{v(j,k)} / \left(\sum_{j,k} \omega_{jk}\right)$$ [Equation 17]

$$\rho_{v(q,p)} = \sum_{j,k} \omega_{jk} \rho_{v(j,k)} / \left(\sum_{j,k} \omega_{jk}\right)$$

$$\rho = (\rho_{v(p,q)} + \rho_{v(q,p)})/2$$

$$t_{pq} = [s_p^T, s_q^T]^T$$ [Equation 18]

$$\omega_{jk} = \exp\left[-\frac{1}{2}(\|t_{pq} - t_{jk}\|_2 / \sigma_{jk})^2\right]$$

$$\omega_{jk} = \exp\left[-\frac{1}{2}(\|t_{qp} - t_{jk}\|_2 / \sigma_{jk})^2\right]$$

In addition, when there are two or more calculating methods for each value, their average value is to be calculated.

Here, derivation of $V_{MAX}$ is described.

First, when it is assumed that probability vectors x and y follow jointly Gaussian distribution, it is expressed as follows.

$$P\left(\begin{pmatrix} x \\ y \end{pmatrix}\right) = N\left(\begin{pmatrix} \mu_x \\ \mu_y \end{pmatrix}, \begin{pmatrix} R_{xx} & R_{xy} \\ R_{yx} & R_{yy} \end{pmatrix}\right)$$ [Equation 19]

Conditional distribution P (x|y) when y is given is expressed as follows.

$$P(x|y) = N(m, C_m)$$ [Equation 20]

Here, $m = \mu_x + R_{xy} R_{yy}^{-1}(y - \mu_y)$ and $C_m = R - R_{xy} R_{yy}^{-1} R_{yx}$.

Since an error term between different illumination conditions is modeled as jointly Gaussian distribution, it is expressed as follows.

$$P\left(\begin{bmatrix} V(s_{new}) \\ V(s) \end{bmatrix}\right) = N\left(\begin{bmatrix} \mu_{Vnew} \\ \mu_V \end{bmatrix}, \begin{bmatrix} S_{Vnew} & R^T \\ R & S_V \end{bmatrix}\right)$$ [Equation 21]

Error term V ($s_{new}$) is represented as Gaussian distribution when V(s) is given as follows.

$$P(V(s_{new})|V(s)) = N(V_{MAP}, S)$$ [Equation 22]

Here, it becomes as follows.

$$V_{MAP} = \mu_{Vnew} + R^T S_V^{-1}(V(s) - \mu_V)$$

$$S = S_{Vnew} - R^T S_V^{-1} R$$ [Equation 23]

Thus, $V_{MAP}$ is derived.

Thus, pre-process for creating registered image group 30 using registered image 20 of the object is completed.

Then, error component information estimation section 43 of registered image group formation section 3 estimates error component $V_{MAP}$ corresponding to the plurality of illumination conditions inputted separately from illumination condition input section 44 (S5) and outputs it to image synthesizing section 45, and image synthesizing section 45 synthesizes a registered image from the value of the error component outputted from error component information estimation section 43 and normal information of the object estimated by normal information estimation section 42 and outputs it (S6 and S7).

As one example of the illumination condition inputted from illumination condition input section 44 in step S5, when the front direction of the face is placed at lateral angle of 0° and vertical angle of 0°, both lateral and vertical angles can be increased by 20° up to 60°. In this case, there are seven kinds of angles, −60°, −40°, −20°, 0°, 20°, 40° and 60°, and there are 49 (7×7) illumination angles combining both lateral and vertical angles. In addition, the angles are not necessarily provided at the same intervals and a certain effective angle may be suitably selected according to purpose and usage. In addition, the plurality of illumination conditions may be previously stored in illumination condition input section 44 or a desired illumination condition may be inputted by a user.

Thus, error component information estimation section 43 estimates error component $V_{MAP}$ corresponding to the predetermined different illumination angles (S6), and since normal albedo vector $B_{MAP}$ and illumination condition $L_{new}$ are known, image synthesizing section 45 calculates luminance value $Y_{new}$ using equation (7) and synthesizes an image, so that plurality of registered image group 30 of the object can be provided (S7).

$$Y_{new} = L_{new}^T B_{MAP} + V_{MAP}$$ [Equation 24]

Thus, the process shown in equation (7) is repeated for the previously determined plural illumination angles (S8), so that registered image group 30 can be created. That is, when the processes for all directions are completed (Y), the processes are completed as a whole and when the process is not completed (N), the operation is returned to step S5.

Figure 5:
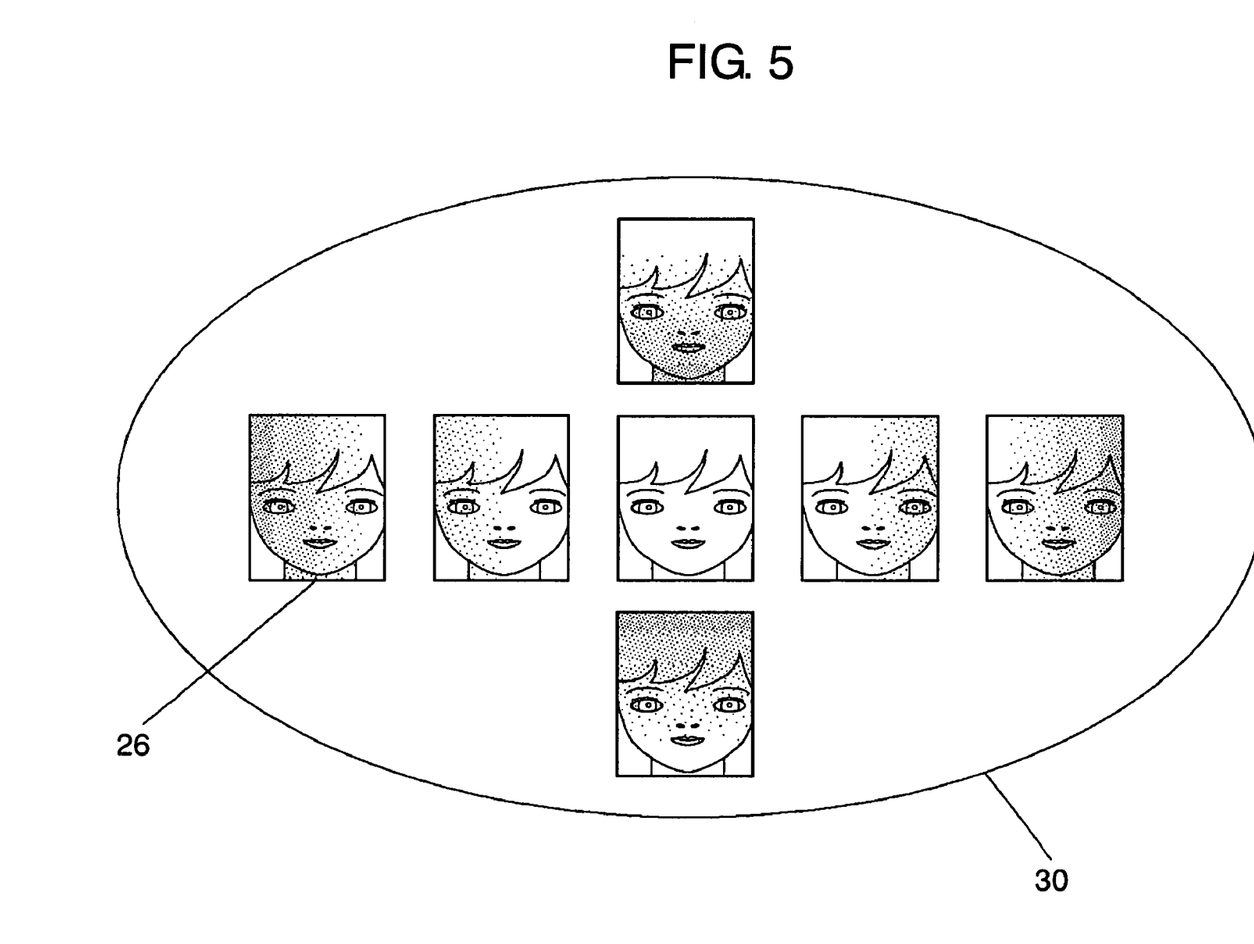
FIG. 5 is a schematic view showing one example of a registered image group according to the first embodiment of the present invention.

FIG. 5 schematically shows one example of registered image group 30 according to the first embodiment of the present invention. As shown in FIG. 5, according to registered image group formation section 3 of image collation device 1 in the first embodiment of the present invention, registered image group 30 having various shades and shadows can be created.

Referring to FIG. 1 again, in image collation device 1 according to the first embodiment of the present invention, registered image group 30 created by registered image group formation section 3 is stored in registered image group storing section 4. Thus, the preparation for collating process in the image collation device 1 according to the first embodiment of the present invention is completed.

Figure 6:
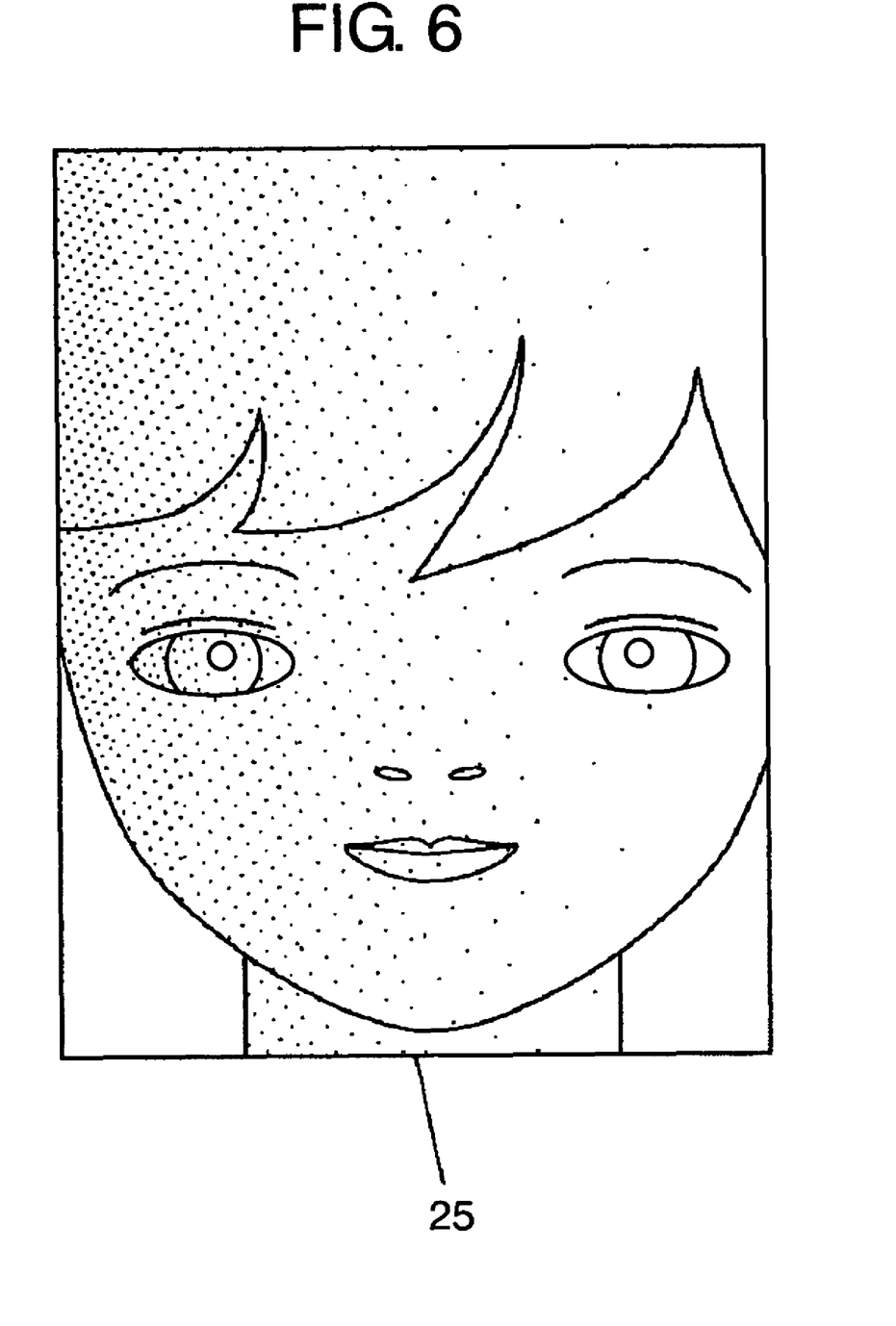
FIG. 6 is a schematic view showing one example of a comparative image according to an embodiment of the present invention.

FIG. 6 schematically shows one example of comparative image 25 according to the embodiment of the present invention. When comparative image 25 of the person to be authenticated is inputted from comparative image input section 5 in image collation device 1 according to the first embodiment of the present invention, comparative image 25 is sent from comparative image input section 5 to comparison and collation section 8 and comparative image 25 and registered image group 30 are compared and collated in comparison and collation section 8 and the result thereof is outputted from output section 9. For example, when comparative image 25 is inputted, it is determined that comparative image 25 is similar to registered image 26 provided by taking the same object in the similar illumination condition among registered image group 30, so that the object of comparative image 25 is regarded as the previously registered person. At this time, when ID information and the like of the corresponding registered person is added to registered image 26, ID information of comparative image 25 is also outputted from output section 9 together with the authentication result. In addition, it is desirable that registered image 26 determined to be similar to comparative image 25 is also outputted from output section 9 to the person to be authenticated in view of prompting that person to confirm it.

As described above, according to image collation device 1 in the first embodiment of the present invention, when registered image group 30 is created, as shown in equation (4), each pixel is not separately treated, the information of the pixel to be calculated is derived from the information of the plurality of pixels, the image formation model (reflection model) capable of treating the plurality of pixels at the same time is assumed, and the calculation is performed using the statistical model of each vector of the image formation model, so that all the pixels can be calculated at the same time in registered image 20 or registered image 20 can be divided into a plurality of regions and calculation can be performed with respect to each divided region. Thus, when registered image 20 is divided into the plurality of regions and calculation is performed for each divided region, the calculation time can be shortened as compared with the case where all the pixels are calculated collectively. This is because since time required for the correlation calculation is proportional to the cube of the number of pixels, the calculation time can be shortened when the calculation is performed by dividing the image into several regions as compared with the case where all the pixels are calculated at one time.

Furthermore, according to image collation device 1 in the first embodiment of the present invention, the calculation is performed using the statistical model capable of treating the plurality of pixels at the same time as shown in equation (4), so that as shown in $$B_{MAP} = [LS_V^{-1}L^T + C_B^{-1}]^{-1}[LS_V^{-1}(Y - \mu_V) + C_B^{-1}\mu_B]$$ [Equation 25]

$$\begin{bmatrix} b11 \\ b12 \\ b13 \\ \vdots \\ bd1 \\ bd2 \\ bd3 \end{bmatrix} \quad \begin{bmatrix} c11 & c'11 \\ c12 & c'12 \\ c13 & c'13 \\ \vdots & \ddots & \vdots \\ cd1 & c'd1 \\ cd2 & c'd2 \\ cd3 & c'd3 \end{bmatrix} \quad \begin{bmatrix} a11 \\ a12 \\ a13 \\ \vdots \\ ad1 \\ ad2 \\ ad3 \end{bmatrix}$$

when MAP estimation is performed, the result of the pixel enclosed by the broken line only can be employed. That is, among the pixels constituting registered image 20, as for the pixel having information by which it is difficult to estimate the normal albedo vector such as a shadow part (hereinafter, referred to as a "low-reliable pixel"), when it is grouped with another clear pixel (hereinafter, referred to as a "high-reliable pixel") and calculated, the normal albedo vector, for example, can be estimated under the condition influenced by the another high-reliable pixel.

Thus, by using image collation device 1 according to the first embodiment of the present invention, even when there is a low-reliable pixel that is dark or has a large specular reflection component in registered image 20 at the time of creating registered image group 30 from registered image 20, more reliable registered image group 30 can be created under the condition influenced by another high-reliable pixel. In addition, regarding this pixel reliability, variance $\Sigma V$ of the value of error component V is calculated with respect to each pixel and the pixel having the resultant value larger than a predetermined threshold value may be determined as the low-reliable pixel and the pixels other than the above pixel may be determined as the high-reliable pixels.

Thus, with image collation device 1 according to the first embodiment of the present invention, a collation rate between comparative image 25 and registered image 30 can be improved.

For example, a first collation rate when comparative image 25 and registered image group 30 are collated by image collation device 1 according to the first embodiment of the present invention can be improved higher than a first collation rate when comparative image 25 and registered image group 30 are collated by the conventional technique. Here, the first collation rate means that a rate in which the registered image of the same object as that of the comparative image is authenticated in first place with respect to the comparative image, so that as the rate becomes higher, it means the precision in authentication is higher.

For example, while the first collation rate is 87.8% when a statistical model is calculated using the same image group, as a bootstrap image, a registered image group is created using this statistical model by a method described in the Non-patent Document 1, and the image is collated using the registered image group, the first collation rate is greatly improved to 94.0% when the image is collated by the image collation device 1 according to the first embodiment of the present invention.

In addition, although the correlation calculation can be performed for a plurality of pixels in registered image 20 at the same time by image collation device 1 according to the first embodiment of the present invention, any pixel can be selected as the pixel on which the correlation calculation is performed. For example, the pixels having high correlation, such as pixels in a vicinity of a nose, in a vicinity an eye, in a vicinity of a cheek can be grouped. When such grouping is performed, in the vicinity of the cheek, since it is considered that the right cheek and left cheek have contrasting normal vectors, when they are grouped in the pixels calculated at the same time and the correlation calculation is performed, more reliable calculation result can be obtained.

In addition, although the description has been made of the case where registered image group formation section 3 is one functional block of image collation device 1 in the first embodiment of the present invention, registered image group formation section 3 may be separated from other functional blocks and may be provided as an image synthesizing device. In this case, the image synthesizing device can be suitable for creating an image group to be stored as the registered image group, in the image collation device and the image collating method.

Second Embodiment

Figure 7:
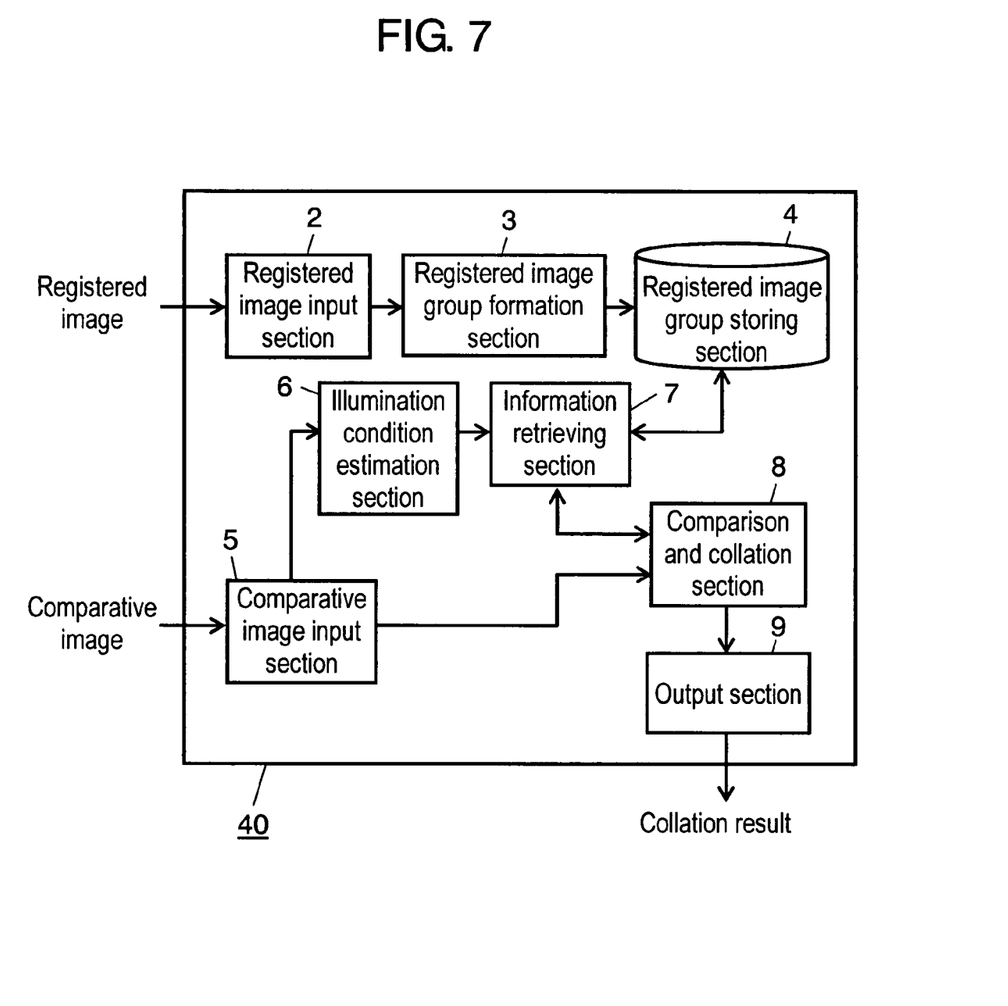
FIG. 7 is a block diagram showing a configuration of an image collation device according to a second embodiment of the present invention.

Next, image collation device 40 according to a second embodiment of the present invention is described. FIG. 7 is a block diagram showing a configuration of image collation device 40 according to the second embodiment of the present invention.

As shown in FIG. 7, image collation device 40 according to the second embodiment of the present invention is different from image collation device 1 according to the first embodiment in that it includes illumination condition estimation section 6 that is a comparative image illumination condition estimation section for estimating an illumination condition such as an illumination direction and its intensity from a comparative image inputted from comparative image input section 5, and information retrieving section 7 that is an image retrieving section for sending the information of the illumination condition estimated by illumination condition estimation section 6, to registered image group storing section 4, and searching and extracting a registered image corresponding to the illumination condition corresponding to the illumination condition of the comparative image, from registered image group 30 stored in registered image group storing section 4 and outputting the same to comparison and collation section 8.

Since other configurations, that is, functions of registered image input section 2, registered image group formation section 3, registered image storing section 4, comparative image input section 5, comparison and collation section 8 and output section 9 are the same as those in image collation device 1 in the first embodiment, the descriptions thereof are omitted.

When the illumination condition is estimated by illumination condition estimation section 6, the estimating method of the illumination condition by illumination condition estimation section 41 of registered image group formation section 3 in image collation device 1 in the first embodiment (the same method as step S2 in FIG. 3) can be used.

In addition, registered image group formation section 3 in the second embodiment of the present invention may provide information regarding the illumination condition such as the illumination direction and intensity as meta-information for each registered image group 30 at the time of creating registered image group 30 and store it in registered image group storing section 4. In this configuration, information retrieving section 7 of image collation device 40 according to the second embodiment of the present invention can retrieve a registered image to be sent to comparison and collation section 8 using the meta-information added to registered image group 30 stored in registered image group storing section 4 as a clue.

In such a configuration, according to image collation device 40 in the second embodiment of the present invention, in addition to the effect provided in image collation device 1 according to the first embodiment, the illumination condition is estimated from comparative image 25 by illumination condition estimation section 6, and the registered image corresponding to the illumination condition estimated by illumination condition estimation section 6 can be retrieved from registered image group 30 stored in registered image group storing section 4 and sent to comparison and collation section 8. For example, when comparative image 25 is inputted as described in the first embodiment, registered image 26 corresponding to the illumination condition is sent from registered image group storing section 4 to comparison and collation section 8 by information retrieving section 7.

Thus, there can be provided a configuration optimal to a small apparatus, in which the number of comparing and collating processes in comparison and collation section 8 can be reduced and operation load to the CPU and the like can be reduced.

Third Embodiment

Figure 8:
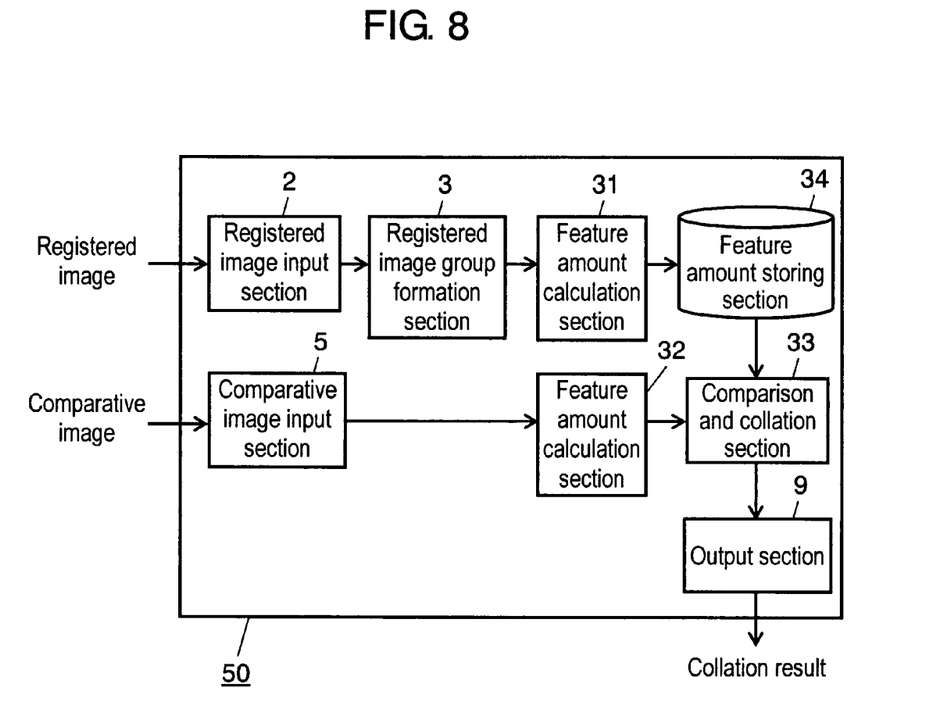
FIG. 8 is a block diagram showing a configuration of an image collation device according to a third embodiment of the present invention.

Next, image collation device 50 according to a third embodiment of the present invention is described. FIG. 8 is a block diagram showing a configuration of image collation device 50 according to the third embodiment of the present invention.

As shown in FIG. 8, image collation device 50 in the third embodiment of the present invention is different from image collation device 1 in the first embodiment in that it includes feature amount calculation section 31 for calculating a feature amount from a comparative image inputted from comparative image input section 5, and feature amount calculation section 32 for calculating a feature amount of each registered image from the registered image created by registered image group formation section 3.

Here, the method of calculating the feature amount from the image by feature amount calculation section 31 and feature amount calculation section 32 includes a graph matching method in which a pattern called a graph is placed at a point showing a facial feature, a correct facial feature point is found and the feature amount at each point and registered data are compared and collated, or Gabor wavelet transform method in which a wavelet waveform is used and only a feature of the waveform (frequency component and the like) is extracted from a transform object, used in signal analysis and image compression, but the present invention is not limited to the above calculating method of the feature point.

In addition, image collation device 50 according to the third embodiment of the present invention includes feature amount storing section 34 for storing the feature amount calculated from the registered image group by feature amount calculation section 31 instead of registered image group storing section 4 in image collation device 1 in the first embodiment.

Furthermore, image collation device 50 according to the third embodiment of the present invention includes comparison and collation section 33 for comparing and collating the feature amount calculated from the comparative image by feature amount calculation section 32 and the feature amount of the registered image group stored in feature amount storing section 34 instead of comparison and collation section 8 in image collation device 1 in the first embodiment.

Since other configurations, that is, functions of registered image input section 2, registered image group formation section 3, comparative image input section 5, and output section 9 are the same as those of components in image collation device 1 in the first embodiment, the descriptions thereof are omitted.

In such a configuration, according to image collation device 50 in the third embodiment of the present invention, in addition to the effect provided by image collation device 1 in the first embodiment, since the feature amount data calculated by feature amount calculation section 31 is stored in feature amount storing section 34, necessary storing capacity may be small as compared with the configuration in which the image information of registered image group storing section 4 itself is stored, so that the apparatus can be miniaturized as a whole and the cost can be lowered.

Furthermore, according to image collation device 50 in the third embodiment of the present invention, in addition to the effect provided by image collation device 1 in the first embodiment, since comparison and collation section 33 compares and collates the feature amounts outputted from feature amount storing section 34 and feature amount calculation section 32, the calculating process in comparison and collation section 33 can be small in size as compared with the configuration in which matching is performed for the entire image, so that there is provided a configuration optimal to a small apparatus, in which operation load to the CPU and the like can be reduced.

In addition, although the description has been made of the case where the face of the person is used as the object in the above embodiments of the present invention, the image synthesizing device, the image collation device using the same and the image synthesizing method according to the present invention are not limited to this usage and an object having a general three-dimensional feature can be used as the object.

As described above, according to the present invention, since the special effect that even when a pixel to be calculated is positioned in shadow, the normal vector and reflectance of that pixel can be correctly estimated and actually matching registered image group can be created can be provided, the present invention can be effectively applied to the image collation device for comparing and collating the inputted two-dimensional image and the previously recorded two-dimensional image, the image synthesizing device for creating the registered image group used especially in the collation of images, and the image collation device using the same, and the image synthesizing method and the like.

The invention claimed is:

1. An image synthesizing device for synthesizing a second image of an object in a predetermined illumination condition from a first image of the object, the image synthesizing device comprising:
- a non-transitory memory device storing a synthesizing program, the synthesizing program being executable by a processor;
- an illumination condition estimation section configured to estimate an illumination condition including an illumination direction and an intensity of the object in the first image from a luminance value of the first image;
- a normal information estimation section configured to estimate normal information containing a normal direction of the object, with regard to a predetermined pixel in the first image, based on the illumination condition estimated by the illumination condition estimation section;
- an error component information estimation section configured to estimate information of an error component other than a diffuse reflection component in a luminance value of the predetermined pixel in the first image, and estimating error component information in the predetermined illumination condition, from the estimated error component information of the error component in the luminance value of the predetermined pixel in the first image; and
- an image synthesizing section configured to synthesize the second image of the object in the predetermined illumination condition, from the normal information of the object estimated by the normal information estimation section, and the error component information in the predetermined illumination condition estimated by the error component information estimation section,
- wherein the normal information estimation section estimates the normal information of the predetermined pixel, from information of a plurality of the pixels in the first image, by estimating the normal direction based on a statistical model calculated by a learning image previously based on the information of the plurality of pixels, the statistical model being a statistical model of each vector of an image generation model represented by:

$$Y = L^T B + V$$

$$Y = \begin{bmatrix} i_1 \\ i_2 \\ \vdots \\ i_{d-1} \\ i_d \end{bmatrix} \quad L^T = \begin{bmatrix} S^t & 0 & 0 & 0 & 0 \\ 0 & S^t & 0 & 0 & 0 \\ 0 & 0 & S^t & 0 & 0 \\ 0 & 0 & 0 & \ddots & 0 \\ 0 & 0 & 0 & 0 & S^t \end{bmatrix} \quad B = \begin{bmatrix} b_1 \\ b_2 \\ \vdots \\ b_{d-1} \\ b_d \end{bmatrix} \quad V = \begin{bmatrix} e_1 \\ e_2 \\ \vdots \\ e_{d-1} \\ e_d \end{bmatrix}$$

where Y is an image vector of a pixel, $L^T$ is an illumination matrix in which transposed matrix $S^T$ of illumination matrix S is diagonally arranged, B is a normal albedo vector, and V is an error vector.

2. The image synthesizing device according to claim 1, wherein
the error component information estimation section estimates the error component information of the predetermined pixel from information of the plurality of pixels in the first image.

3. The image synthesizing device according to claim 2, wherein
the error component information estimation section estimates the error component information based on a statistical model calculated by a learning image previously based on the information of the plurality of pixels.

4. The image synthesizing device according to claim 1, further comprising:
an illumination condition input section configured to receive an illumination condition containing a plurality of illumination angles different from one another,
wherein the image synthesizing section synthesizes the second image in each of a plurality of illumination conditions inputted from the illumination condition input section.

5. An image collation device comprising:
the image synthesizing device according to claim 4;
a registered image group storing section configured to store the second image created by the image synthesizing device as a registered image group;
a comparative image input section configured to receive a comparative image to be compared; and
a comparison and collation section configured to compare and collate the comparative image inputted from the comparative image input section and the registered image group stored in the registered image group storing section.

6. The image collation device according to claim 5, further comprising:
a comparative image illumination condition estimation section configured to estimate an illumination condition in the comparative image inputted by the comparative image input section; and
an image retrieving section configured to retrieve a registered image in the illumination condition estimated by the comparative image illumination condition estimation section, from the registered image group storing section,
wherein the comparison and collation section collates the registered image retrieved by the image retrieving section and the comparative image.

7. The image collation device according to claim 5, further comprising:
a first feature amount calculation section configured to calculate a feature amount of the second image created by the image synthesizing device; and
a second feature amount calculation section configured to calculate a feature amount of the comparative image inputted by the comparative image input section,
wherein the registered image group storing section stores the feature amount of the second image, and the comparison and collation section compares and collates the registered image group and the comparative image using the feature amount.

8. An image synthesizing method of synthesizing a second image of an object in a predetermined illumination condition from a first image of the object, the image synthesizing method comprising:
estimating an illumination condition including an illumination direction and an intensity of the object in the first image from a luminance value of the first image;

estimating normal information containing a normal direction of the object, with regard to a predetermined pixel in the first image, based on the illumination condition estimated;

estimating information of an error component other than a diffuse reflection component in the luminance value of the predetermined pixel in the first image, and estimating error component information in the predetermined illumination condition, from the estimated error component information of the error component in the luminance value of the predetermined pixel in the first image; and synthesizing the second image of the object in the predetermined illumination condition, from the normal information of the object estimated, and the error component information in the predetermined illumination condition estimated, wherein the normal information of the predetermined pixel is estimated from information of a plurality of the pixels in the first image, by estimating the normal direction based on a statistical model calculated by a learning image previously based on the information of the plurality of pixels, the statistical model being a statistical model of each vector of an image generation model represented by:

$$Y = L^T B + V$$

$$Y = \begin{bmatrix} i_1 \\ i_2 \\ \vdots \\ i_{d-1} \\ i_d \end{bmatrix} \quad L^T = \begin{bmatrix} S^t & 0 & 0 & 0 & 0 \\ 0 & S^t & 0 & 0 & 0 \\ 0 & 0 & S^t & 0 & 0 \\ 0 & 0 & 0 & \ddots & 0 \\ 0 & 0 & 0 & 0 & S^t \end{bmatrix} \quad B = \begin{bmatrix} b_1 \\ b_2 \\ \vdots \\ b_{d-1} \\ b_d \end{bmatrix} \quad V = \begin{bmatrix} e_1 \\ e_2 \\ \vdots \\ e_{d-1} \\ e_d \end{bmatrix}$$

where Y is an image vector of a pixel, $L^T$ is an illumination matrix in which transposed matrix $S^T$ of illumination matrix S is diagonally arranged, B is a normal albedo vector, and V is an error vector.

9. A non-transitory computer-readable recording medium storing a program for synthesizing a second image of an object in a predetermined illumination condition from a first image of the object, enabling a computer to execute steps comprising:

estimating an illumination condition including an illumination direction and an intensity of the object in the first image from a luminance value of the first image;

estimating normal information containing a normal direction of the object, with regard to a predetermined pixel in the first image, based on the illumination condition estimated;

estimating information of an error component other than a diffuse reflection component in the luminance value of the predetermined pixel in the first image, and estimating error component information in the predetermined illumination condition, from the estimated error component information of the error component in the luminance value of the predetermined pixel in the first image; and synthesizing the second image of the object in the predetermined illumination condition, from the normal information of the object estimated, and the error component information in the predetermined illumination condition estimated, wherein the normal information of the predetermined pixel is estimated from information of a plurality of the pixels in the first image, by estimating the normal direction based on a statistical model calculated by a learning image previously based on the information of the plurality of pixels, the statistical model being a statistical model of each vector of an image generation model represented by:

$$Y = L^T B + V$$

$$Y = \begin{bmatrix} i_1 \\ i_2 \\ \vdots \\ i_{d-1} \\ i_d \end{bmatrix} \quad L^T = \begin{bmatrix} S^t & 0 & 0 & 0 & 0 \\ 0 & S^t & 0 & 0 & 0 \\ 0 & 0 & S^t & 0 & 0 \\ 0 & 0 & 0 & \ddots & 0 \\ 0 & 0 & 0 & 0 & S^t \end{bmatrix} \quad B = \begin{bmatrix} b_1 \\ b_2 \\ \vdots \\ b_{d-1} \\ b_d \end{bmatrix} \quad V = \begin{bmatrix} e_1 \\ e_2 \\ \vdots \\ e_{d-1} \\ e_d \end{bmatrix}$$

where Y is an image vector of a pixel, $L^T$ is an illumination matrix in which transposed matrix $S^T$ of illumination matrix S is diagonally arranged, B is a normal albedo vector, and V is an error vector.

* * * * *